US008831946B2

(12) United States Patent
Mamou (10) Patent No.: US 8,831,946 B2
(45) Date of Patent: Sep. 9, 2014

(54) METHOD AND SYSTEM OF INDEXING SPEECH DATA

(75) Inventor: Jonathan Joseph Mamou, Jerusalem (IL)

(73) Assignee: Nuance Communications, Inc., Burlington, MA (US)

( * ) Notice: Subject to any disclaimer, the term of this patent is extended or adjusted under 35 U.S.C. 154(b) by 1003 days.

(21) Appl. No.: 11/781,285

(22) Filed: Jul. 23, 2007

(65) Prior Publication Data
US 2009/0030680 A1    Jan. 29, 2009

(51) Int. Cl.
     *G10L 15/00*      (2013.01)
     *G10L 15/04*      (2013.01)
     *G10L 15/26*      (2006.01)
     *G06F 17/30*      (2006.01)

(52) U.S. Cl.
     CPC ............... *G10L 15/265* (2013.01); *G06F 17/30746* (2013.01)
     USPC ............... 704/254; 704/251; 704/253

(58) Field of Classification Search
     CPC ............... G06F 17/30746; G06F 17/30755; G10L 15/265
     USPC ............... 704/231, 251, 254, E15.045
     See application file for complete search history.

(56) References Cited

U.S. PATENT DOCUMENTS

| | | | |
|---|---|---|---|
| 5,500,920 A | | 3/1996 | Kupiec |
| 5,675,706 A | | 10/1997 | Lee et al. |
| 5,794,249 A | * | 8/1998 | Orsolini et al. ............... 704/200 |
| 6,076,054 A | | 6/2000 | Vysotsky et al. |
| 6,185,527 B1 | * | 2/2001 | Petkovic et al. ............... 704/231 |
| 6,243,676 B1 | * | 6/2001 | Witteman ............... 704/243 |
| 6,314,400 B1 | * | 11/2001 | Klakow ............... 704/257 |
| 6,345,252 B1 | | 2/2002 | Beigi et al. |
| 6,345,253 B1 | | 2/2002 | Viswanathan |
| 6,393,398 B1 | * | 5/2002 | Imai et al. ............... 704/254 |
| 6,505,153 B1 | * | 1/2003 | Van Thong et al. ............... 704/211 |
| 6,507,816 B2 | | 1/2003 | Ortega |

(Continued)

OTHER PUBLICATIONS

T. Hori et al., "Open-Vocabulary Spoken Utterance Retrieval Using Confusion Networks", people.csail.mit.edu/hazen/publications/icassp07_hori.pdf.

(Continued)

*Primary Examiner* — Richemond Dorvil
*Assistant Examiner* — Michael Ortiz Sanchez
(74) *Attorney, Agent, or Firm* — Wolf, Greenfield & Sacks, P.C.

(57) ABSTRACT

A method and system of indexing speech data. The method includes indexing word transcripts including a timestamp for a word occurrence; and indexing sub-word transcripts including a timestamp for a sub-word occurrence. A timestamp in the index indicates the time and duration of occurrence of the word or sub-word in the speech data, and word and sub-word occurrences can be correlated using the timestamps. A method of searching speech transcripts is also provided in which a search query in the form of a phrase to be searched includes at least one in-vocabulary word and at least one out-of-vocabulary word. The method of searching includes extracting the search terms from the phrase, retrieving a list of occurrence of words for an in-vocabulary search term from an index of words having timestamps, retrieving a list of occurrences of sub-words for an out-of-vocabulary search term from an index of sub-words having timestamps, and merging the retrieved lists of occurrences of words and sub-words according to their timestamps.

24 Claims, 4 Drawing Sheets

(56) References Cited

U.S. PATENT DOCUMENTS

| | | | |
|---|---|---|---|
| 6,873,993 B2 | 3/2005 | Charlesworth et al. | |
| 6,990,448 B2 | 1/2006 | Charlesworth et al. | |
| 7,054,812 B2* | 5/2006 | Charlesworth et al. | 704/251 |
| 7,177,795 B1* | 2/2007 | Chen et al. | 704/9 |
| 7,181,398 B2* | 2/2007 | Thong et al. | 704/254 |
| 7,240,003 B2* | 7/2007 | Charlesworth et al. | 704/254 |
| 7,310,600 B1* | 12/2007 | Garner et al. | 704/234 |
| 7,315,818 B2* | 1/2008 | Stevens et al. | 704/251 |
| 7,603,273 B2* | 10/2009 | Poirier | 704/235 |
| 7,912,699 B1* | 3/2011 | Saraclar et al. | 704/9 |
| 8,005,676 B2* | 8/2011 | Duke et al. | 704/254 |
| 8,650,031 B1* | 2/2014 | Mamou et al. | 704/235 |
| 2002/0022960 A1* | 2/2002 | Charlesworth et al. | 704/251 |
| 2002/0026309 A1* | 2/2002 | Rajan | 704/200.1 |
| 2002/0052740 A1* | 5/2002 | Charlesworth et al. | 704/220 |
| 2002/0138265 A1* | 9/2002 | Stevens et al. | 704/251 |
| 2002/0188453 A1* | 12/2002 | Hirschberg et al. | 704/270 |
| 2003/0023437 A1 | 1/2003 | Fung | |
| 2003/0177108 A1* | 9/2003 | Charlesworth et al. | 707/1 |
| 2004/0210443 A1 | 10/2004 | Kuhn et al. | |
| 2005/0203751 A1* | 9/2005 | Stevens et al. | 704/276 |
| 2006/0015339 A1* | 1/2006 | Charlesworth et al. | 704/251 |
| 2006/0259302 A1 | 11/2006 | Lewis et al. | |
| 2007/0133518 A1* | 6/2007 | Ben-David et al. | 370/352 |
| 2008/0082336 A1* | 4/2008 | Duke et al. | 704/254 |
| 2009/0030680 A1* | 1/2009 | Mamou | 704/235 |
| 2009/0030894 A1 | 1/2009 | Mamou et al. | |
| 2009/0150152 A1* | 6/2009 | Wasserblat et al. | 704/254 |

OTHER PUBLICATIONS

A. Yazgan et al., "Hybrid language models for out of vocabulary word detection in large vocabulary conversational speech recognition", 2004 IEEE International Conference on Acoustics, Speech, and Signal Processing, Publication date: 2004.

B. Logan et al., "Approaches to Reduce the Effects of OOV Queries on Indexed Spoken Audio", Publisher: HP Labs Cambridge, Document No. HPL-2003-46; Date: Mar. 19, 2003.

A. Amir et al. "Advances in Phonetic word Spotting", IBM Research Report, RJ10215, Aug. 29, 2001.

Mark Clements et al., "Phonetic Searching vs. LVCSR: How to find what you really want in audio archives", International Journal of Speech Technology, vol. 5, No. 1, Jan. 2002, pp. 9-22.

Mark Clements et al., "Phonetic Searching Applied to On-Line Distance Learning Modes", Digital Signal Processing Workshop, 2002 and the 2nd Signal Processing Education Workshop. Proceedings of 2002 IEEE 10$^{th}$ Volume, Issue, Oct. 13-16, 2002 pp. 186-191.

A. Amir et al., "Mutual Relevance Feedback for Multimodal Query Formulation in Video Retrieval", Proceedings of the 7th ACM SIGMM international workshop on Multimedia information retrieval, pp. 17-24, Year of Publication: 2005.

A. Amir et al., "Search the Audio, Browse the Video . . .", EURASIP Journal on Applied Signal Processing, 2003:2, 209-222.

Michael J. Witbrock, "Using Words and Phonetic Strings for Efficient Information Retrieval from Imperfectly Transcribed Spoken Documents," International Conference on Digital Libraries, Proceedings of the second ACM international conference on Digital libraries Philadelphia, Pennsylvania, United States, pp. 30-35, Year of Publication: 1997.

Agrawal et al., Automated Ranking of Database Query Results. Proc 2003 CIDR Conf. 2003. 12 pages.

Bazzi et al., Modeling Out-of-Vocabulary Words for Robust Speech Recognition. 2000. 4 pages.

Fagin et al., Optimal aggregation algorithms for middleware. J Comp Syst Sci. 2003;66:614-56.

Garofolo et al., The TREC Spoken Document Retrieval Track: A Success Story. National Institute of Standards and Technology. Proc 9th Text Retr Conf (TREC-9). 2000. 23 pages.

Jones et al., Retrieving Spoken Documents by Combining Multiple Index Sources. ACM SIGIR '96. 1996;30-8.

Logan et al., An Experimental Study of an Audio Indexing System for the Web. Proc ICSLP. 1996;676-9.

Mamou et al., Vocabulary Independent Spoken Term Detection. SIGIR '07: Proc 30th Ann Int ACM SIGIR Conf Res Dev Info Retr. 2007. 8 pages.

Matthews et al., Fast Audio Search Using Vector Space Modelling. IEEE ASRU. 2007:641-6.

Saraclar et al., Lattice-Based Search for Spoken Utterance Retrieval. HLTNAACL: Main Proc. 2004;129-36.

Woodland et al., Effects of Out of Vocabulary Words in Spoken Document Retrieval. Poster Session. SIGIR '00: Proc 23rd Ann Int ACM SIGIR Conf Res Dev Info Retr. 2000. 372-4.

Nishizaki et al., Robust Spoken Document Retrieval Methods for Misrecognition and Out-of-Vocabulary Keywords. Systems and Computers in Japan. 2004;45(14):44-53.

Mangu et al., Finding consensus in speech recognition: word error minimization and other applications of confusion networks. Article submitted to Computer Speech and Language. 2000.

Dharanipragada, et al., "A Multistage Algorithm for Spotting New Words in Speech," *IEEE Transactions on Speech and Audio Processing*, vol. 10, No. 8, Nov. 2002, pp. 542-550.

\* cited by examiner

METHOD AND SYSTEM OF INDEXING SPEECH DATA

FIELD OF THE INVENTION

This invention relates to the field of indexing speech data. In particular, the invention relates to indexing speech data including in-vocabulary (IV) and out-of-vocabulary (OOV) words.

BACKGROUND OF THE INVENTION

The rapidly increasing amount of spoken data calls for solutions to index and search speech data based on its content. It would be beneficial to be able to use keyword and phrase queries when searching the speech data. It would also be beneficial to be able to search for terms that are not part of the common vocabulary (names, technical terms, etc. . . . ) without affecting the performances of the search.

A known spoken document retrieval uses a large vocabulary continuous automatic speech recognition (ASR) system to transcribe speech to one-best path word transcripts. The transcripts are indexed as clean text. An index stores for each occurrence: its document, its word offset and, optionally, some additional information. A generic IR (information retrieval) system over the text is used for word spotting and search. Some other known systems use richer transcripts, like word lattices and word confusion networks, and have been developed in order to improve the effectiveness of the retrieval.

However, a significant drawback of such approaches is that search on queries containing out-of-vocabulary (OOV) terms will not return any results. OOV terms are words missing from the ASR system word vocabulary and these words are replaced in the output word transcript by alternatives that are probable, given the recognition acoustic model, the language model and the word vocabulary. It has been experimentally observed that over 10% of user queries contain OOV terms, as queries often relate to named entities that typically have a poor coverage in the ASR vocabulary. Moreover, in many applications the OOV rate may get worse over time unless the ASR vocabulary is periodically updated. The problem of OOV terms search applies in different types of speech data like broadcast news, conversational telephony speech, call center data and conference meetings.

A known approach which has been developed in order to handle OOV queries consists of converting the speech data to sub-word transcripts. The sub-words are typically phones, morphemes, syllables, or a sequence of phones. The sub-word transcripts are indexed in a same manner as words in using classical text retrieval techniques but during query processing, the query is represented as a sequence of sub-words. The retrieval is based on searching the string of phones representing the query in the phonetic transcript. Some other systems using richer transcripts like phonetic lattices have been developed.

The main drawback of these approaches is the inherent high error rate of the sub-word transcripts. Consequently, such approaches should be used only for OOV search and not for IV terms. For searching queries containing both OOV and IV terms, this technique affects the performance of the retrieval in comparison to the word based approach.

To summarize, there are two different approaches for speech retrieval. Using the word based approach, which cannot handle queries containing OOV terms and using the sub-words based approach in which the overall performance of the retrieval is affected.

An improvement in word searching accuracy has been shown using a combination of word and sub-word (e.g., phone) transcripts. This proposes three different retrieval strategies:

1. Search both the word and the sub-word indices and unify the two different sets of results;
2. Search the word index for IV queries, search the sub-word index for OOV queries; or
3. Search the word index; if no result is returned, search the sub-word index.

However, no known strategy can handle searches for phrases containing both IV and OOV words.

An aim of the present invention is to be able to process all kind of queries, including hybrid phrases combining both IV and OOV terms, without affecting the performance of the retrieval. A solution is to merge the two different approaches presented above: the word based approach for IV terms and the sub-word based approach for OOV terms. However, for hybrid query processing, the posting lists retrieved from a word index and a sub-word index would need to be combined. In conventional IR, for each occurrence of a term, the index stores its sentence number and word offset. Consequently, it is not possible to merge posting lists retrieved by a sub-word index with those retrieved by a word index since the sentence number and offset of the occurrences retrieved from the two different indices are not comparable.

SUMMARY OF THE INVENTION

According to a first aspect of the present invention there is provided a method of indexing speech data, the method comprising: indexing word transcripts, including a timestamp for a word occurrence; indexing sub-word transcripts, including a timestamp for a sub-word occurrence; wherein a timestamp in the index indicates the time of occurrence of the word or sub-word in the speech data; and wherein word and sub-word occurrences can be correlated using the timestamps.

According to a second aspect of the present invention there is provided a method of searching speech data including in-vocabulary and out-of-vocabulary words, comprising: receiving a search query in the form of a phrase to be searched including at least one in-vocabulary word and at least one out-of-vocabulary word; extracting the search terms from the phrase; retrieving a list of occurrences of words for an in-vocabulary search term from an index of words having timestamps; retrieving a list of occurrences of sub-words for an out-of-vocabulary search term from an index of sub-words having timestamps; and merging the retrieved lists of occurrences of words and sub-words according to their timestamps.

According to a third aspect of the present invention there is provided a system for searching speech transcripts from speech recognition systems, wherein a speech recognition system has a vocabulary of words, the system including an indexing system comprising: indexing word transcripts, including a timestamp for a word occurrence; indexing sub-word transcripts, including a timestamp for a sub-word occurrence; wherein a timestamp in the index indicates the time of occurrence of the word or sub-word in the speech data; and wherein word and sub-word occurrences can be correlated using the timestamps.

According to a fourth aspect of the present invention there is provided a computer program product stored on a computer readable storage medium for indexing speech data, comprising computer readable program code means for performing the steps of: indexing word transcripts, including a timestamp for a word occurrence; indexing sub-word transcripts, including a timestamp for a sub-word occurrence; wherein a timestamp in the index indicates the time of occurrence of the word or sub-word in the speech data; and wherein word and sub-word occurrences can be correlated using the timestamps.

The best element of comparison between sub-word and word transcripts is the timestamps. The present invention uses timestamps to enable the merging of search results from sub-word and word transcripts The approach handles queries as follows:
1. Queries containing only IV terms are processed using the word based index.
2. Queries containing only OOV terms are processed using the sub-word based index.
3. In keyword queries with more than one keyword, the keyword is searched for independently of other keywords in the query and the results are added together. Keyword queries containing both IV and OOV terms are processed using the word based index for IV terms and the sub-word based index for OOV terms, and unifying the two different sets of results.
4. Phrase queries contain more than one word and occurrences of the entire phrase are searched for. Results of occurrences of the individual words within the phrase must be combined. Phrase queries containing both IV and OOV terms are handled by merging the posting lists of the IV terms retrieved from the word based index with the posting lists of the OOV terms retrieved from the sub-word based index. The combining is carried out using timestamps for each occurrence stored in the relevant index.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
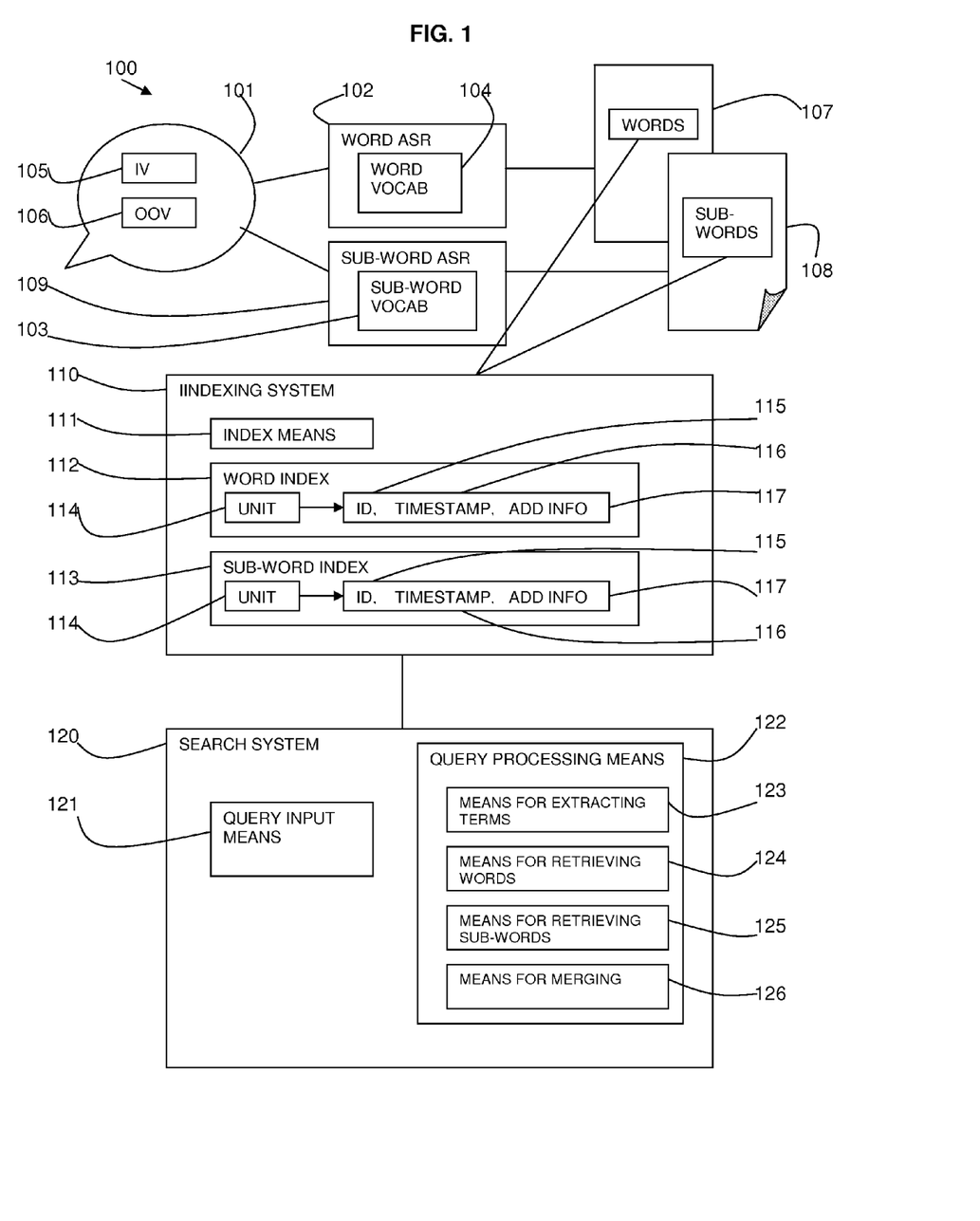
FIG. 1 is a block diagram of a system in accordance with the present invention.

FIG. 1 shows a system 100 in accordance with the invention. Speech data 101 is transcribed into word transcripts 107 and sub-word transcripts 108.

Speech data 101 is transcribed by an automatic speech recognition (ASR) system 102 to convert it into word transcripts 107. The ASR system 102 contains a word vocabulary 104 of terms which it recognizes from the input speech 101. The terms in this word vocabulary 104 are referred to as in-vocabulary (IV) terms 105. Terms which are in the speech data 101, but which are not in the word vocabulary 104 of the ASR system 102, are referred to as out-of-vocabulary (OOV) terms 106.

The ASR system 102 working with the word vocabulary 104 can recognize only terms in the word vocabulary 104. The OOV terms 106 are output in the word transcripts 103 as terms from the word vocabulary 104 that are probable given the recognition acoustic model and the language model. For example, if the term "spline" has been spoken and this term is not in the word vocabulary 104, it will be transcribed by "screen" which is the closes fit to the word from the word vocabulary 104.

A sub-word ASR 109 is provided which converts the speech data 101 to sub-word transcripts 108. The sub-words are typically phones, morphemes, syllables, or a sequence of phones. The sub-word ASR 109 works with language models to transcribe the speech data 101 into sub-words. In particular, it includes a sub-word vocabulary 103 to recognize sub-words in the speech data 101.

Both word and sub-word transcripts 107, 108 are built on all the speech data. The word transcript 107 contains a transcript of all the words in the speech data 101 using the IV terms in the word vocabulary 104. All OOV terms 106 in the speech data 101 will be transcribed incorrectly as IV terms since the OOV terms cannot be recognized using word transcription. The sub-word transcript 108 will contain the sub-word transcription of all the terms (IV and OOV) in the speech data 101 into sub-words from the sub-word vocabulary 103.

An indexing system 110 is provided that includes an indexing means 111 for processing terms in the word and sub-word transcripts 107, 108 to index the terms for search retrieval. The indexing system 110 may access the transcripts 107, 108 to be processed via a network. The indexing system 110 of the described system includes a first index 112 for word transcripts 107, and a second index 113 for sub-word transcripts 108.

In each of the indices 112, 113 the transcribed word or sub-word is stored as a unit 114 with a transcript or speaker identifier 115 and a timestamp 116 (for example, of the form of a start time and duration). The timestamp 116 of an unit 114 (word or sub-word) represents the time information in the speech data 101 about this unit 114. Generally, it is a start time of the unit 114 in the speech 101 and its duration.

Optionally, additional information 117 may also be included in the indices for a word 107 or sub-word 108. The additional information 117 may include, for example, posterior probability, rank relative to other hypotheses, etc. The posterior probability is the probability of the unit given the signal. In the case that the ASR hesitates between several alternatives (e.g. between "will come" and "welcome"), the rank is the relative position of the alternative among the other alternatives occurring at the same time.

The first and second indices 112, 113 may be combined in a single index containing words and sub-words with an indication as to whether a stored unit is a word or a sub-word, so that the different categories can be independently searched.

A search system 120 is provided for searching the first and second indices 112, 113 for a query term. The search system 120 may access the indices 112, 113 remotely via a network. The search system 120 includes a query input means 121 in which a use can input a query. The query may take the form of a single keyword, several keywords to be search independently (for example, including OR/AND/NOT semantics between the keywords), a query phrase formed of a plurality of words to be searched as a single entity, or a combination of phrases and keywords.

The search system 120 includes a query processing means 122 which includes: a means for extracting 123 terms from the query; a means for retrieving 124 a posting list from the word index 112; a means for retrieving 125 a posting list from the sub-word index 113; and a merging means 126. The merging means 126 merges the posting lists from the word and sub-word indices 112, 113 using the timestamps 116 stored in the indices 112, 113.

Figure 2:
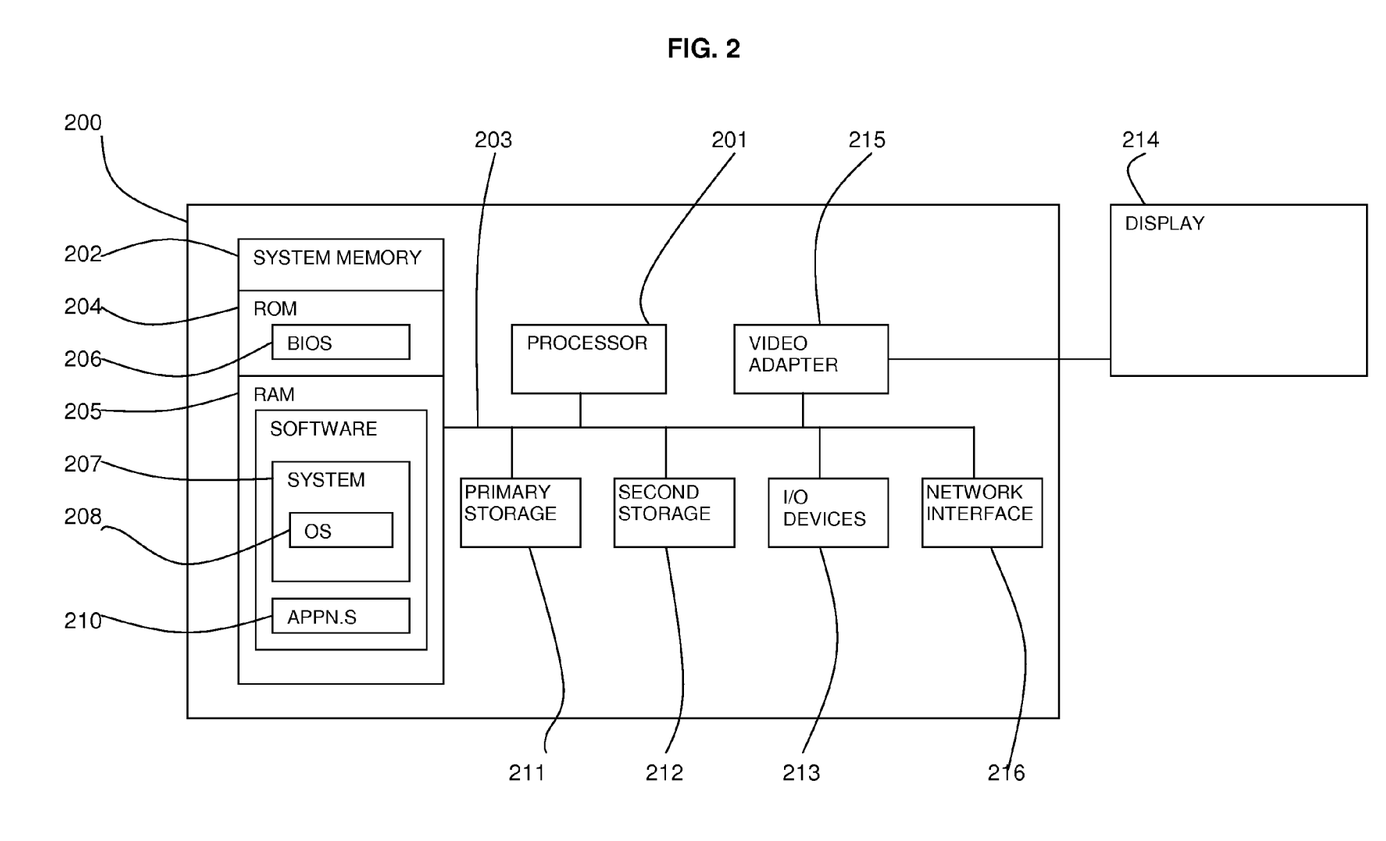
FIG. 2 is a block diagram of a computer system in which the present invention may be implemented.

Referring to FIG. 2, an exemplary system for implementing the indexing system 110 or the search system 120 of the system 100 of FIG. 1, includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Figure 3:
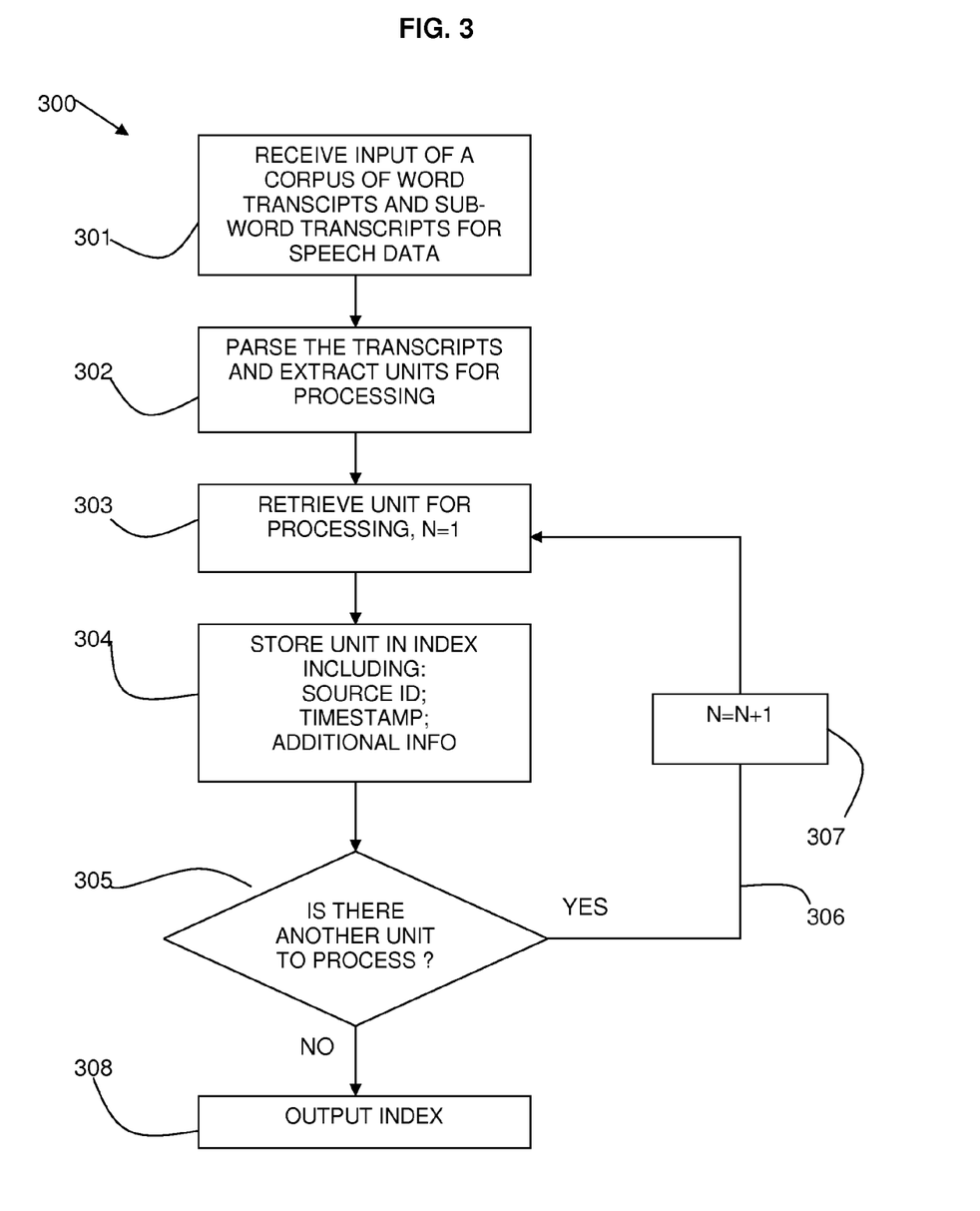
FIG. 3 is a flow diagram of a method of indexing in accordance with an aspect of the present invention.

An indexing algorithm is described with reference to FIG. 3. FIG. 3 shows a flow diagram 300 of a method of indexing. An input 301 of a corpus of both word transcripts and sub-word transcripts of speech data is received. The corpus is processed, by parsing 302 the transcripts and extracting the units for processing.

A first unit (n=1) in the form of a word or sub-word for indexing is retrieved 303. The unit is stored 304 in the index including:
 a transcript or speaker identifier;
 a timestamp, for example, a start time and duration; and
 optionally, additional data provided by the transcript on the unit (e.g. the posterior probability, the name of the audio file, the word offset, etc.).

It is then determined 305 if there is a next unit for processing. If so, the method loops 306 and increments to unit n=n+1 307, and retrieves 303 and stores 304 the next unit. If there are no more units for processing, an index of the corpus of transcripts is output 308.

The indexing model is generic and is the same for all the different types of transcripts (e.g. one-best path, lattice, confusion network) providing a timestamp for each unit. The word and sub-word transcripts are indexed in two different indices.

Figure 4:
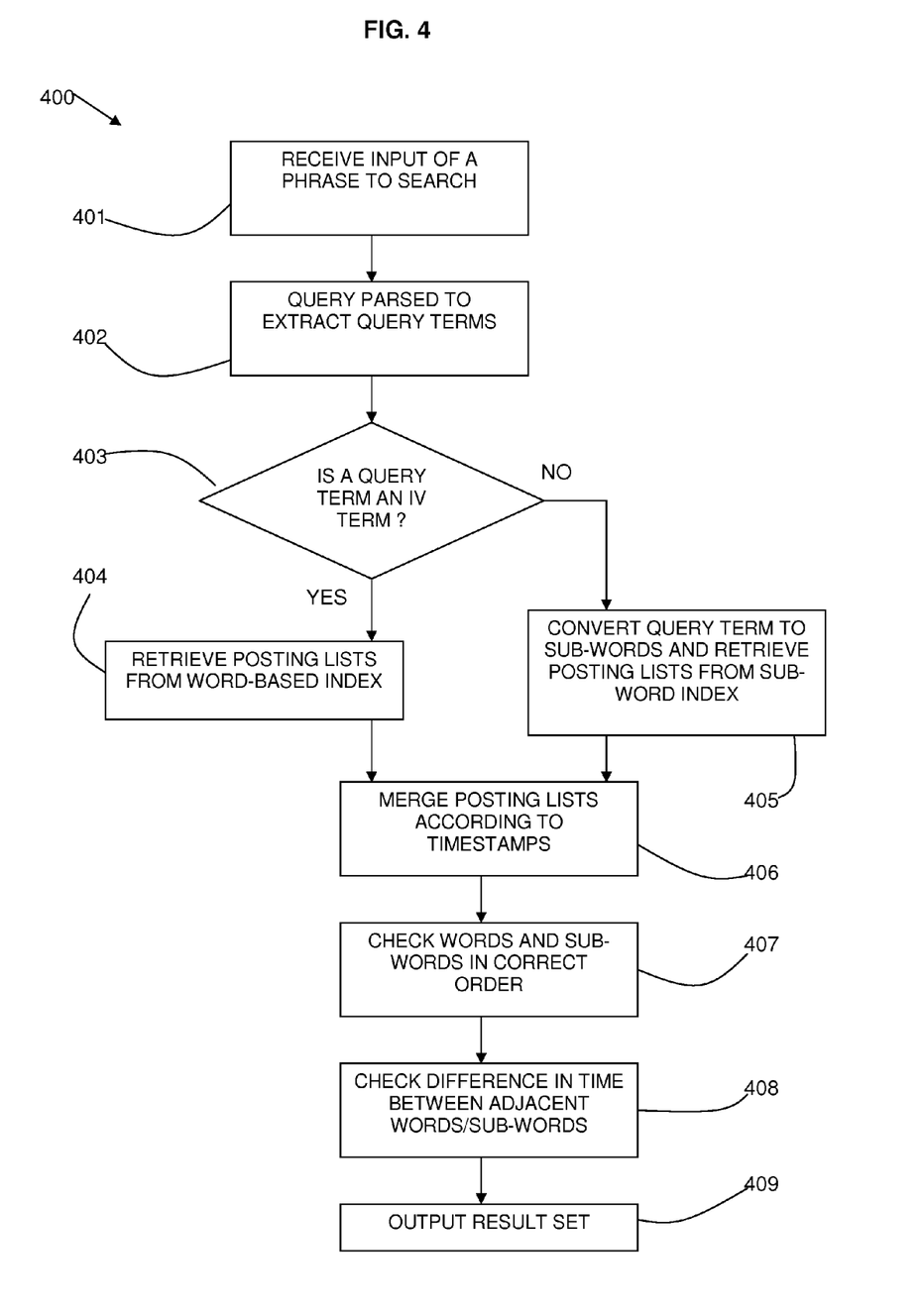
FIG. 4 is a flow diagram of a method of searching in accordance with an aspect of the present invention.

A search algorithm is described with reference to FIG. 4. FIG. 4 shows a flow diagram 400 of a method of searching based on a phrase query which may include both IV and OOV terms.

The query may be submitted in different forms, including:
 a written query in which a user inputs the text of the query;
 a spoken query in which a user speaks the text of the query and a speech recognition system transcribes the query; and/or
 an image query in which the user supplies an image containing text of the query and an optical character recognition (OCR) system is used to find the written text of the query.
A combination of the above forms of query may also be submitted.

An input of a phrase to search in the speech data is received 401. The query is parsed 402 in order to extract the query terms. It is then determined 403 for each query term, if it is an IV term.

For IV query terms, the posting lists are retrieved 404 from the word based index. For non-IV terms, which must be OOV query terms the terms are converted to sub-words and the posting list of each sub-word is retrieved 405 from the sub-word index.

The different posting lists are merged 406 according to the timestamp of the occurrences in order to create results matching the query. It is checked 407 that the words and sub-words appear in the right order according to their begin times, and it is checked 408 that the difference in time between adjacent words/sub-words is reasonable (for example, less that 0.5 seconds).

The set of all the exact matches of the given phrase in the speech corpus is output 409 as the search result.

It should be noted that for keyword searches (and not phrase searches as described above), the indexing model allows use of the classical approaches which:
 handles queries containing only IV terms using the word based index;
 handles queries containing only OOV terms using the sub-word based index; and
 handles queries containing both IV and OOV terms by unifying results retrieved respectively from the word based and the sub-word based indices.

Precision and recall can be measured by comparing the results obtained using the described method over a set of automatic transcripts to the results obtained over the reference manual transcripts. This approach for measuring search effectiveness using manual data as a reference is very common in spoken data retrieval. Three different approaches have been compared:
 1. the conventional method of using only a word based index;
 2. the conventional method of using only a sub-word based index; and
 3. the described method of combining word and sub-word based indices, based on the timestamps of the occurrences of the query terms.

The following table summarizes the retrieval performances according to each approach and to each type of query. The types of query are an IV phase query, an OOV phase query, and a hybrid query which is a phrase query including both IV and OOV terms. A set of 1000 queries containing only IV terms was used, 50 queries containing only OOV terms, and 50 hybrid queries containing both IV and OOV terms. Queries are phrases containing between 1 and 5 words and they were generated by the National Institute of Standards and Technology for the Spoken Term Detection (STD) Evaluation 2006 (see www.nist.gov/speech/tests/std/docs/std06-eval-plan-v10.pdf).

| Indexing Model | Word based | | Sub-word based | | Combined method | |
|---|---|---|---|---|---|---|
| | Precision | Recall | Precision | Recall | Precision | Recall |
| IV query | 0.8 | 0.96 | 0.11 | 0.77 | 0.8 | 0.96 |
| OOV query | 0 | 0 | 0.13 | 0.79 | 0.13 | 0.79 |
| Hybrid query | 0 | 0 | 0.15 | 0.71 | 0.89 | 0.83 |

As expected, the described approach of the combined method leads to the same retrieval performance as the word based approach for IV terms and to the same retrieval performance as the sub-word based approach for OOV terms. The described approach of the combined method outperforms the word based and sub-word based approaches for a hybrid phrase search.

The described searching method can be used by any search engine on speech data including, for example, call center recorded calls, broadcast news, etc.

In a second embodiment, the described indexing method and system can be extended to video indexing. In this application, image features are correlated with speech features according to the timestamps.

This would enable a search of a video corpus. The visual part of the video is indexed after feature extraction and analysis in an image index and the speech/audio part is indexed after transcription and analysis in a speech/audio data index. Both indices include units which are timestamped. Additionally, the speech data index can include two sub-indices for words and sub-words as described above.

The query can combine video, (written and spoken) text, and image. For example, a query may combine an image and a written text, where the user expects to get results where the image part and the textual part of the query appear in a close time in the video. If the indices contain timestamp information about the indexed images and speech transcripts, such a query can be processed.

The described method also permits a ranking model based on temporal proximity. In one embodiment of a ranking model, for OOV term ranking, information provided by the phonetic index is used. A higher rank is given to occurrences of OOV terms that contain phones that are close in time to each other. A scoring function is defined that is related to the average gap in time between the different phones.

A keyword k is converted to the sequence of phones $(p_0^k, \ldots, p_l^k)$. The normalized score, score$(k,t_0^k,D)$ of a keyword $k=(p_0^k, \ldots, p_l^k)$, where each $p_i^k$ occurs at time $t_i^k$ with a duration $d_i^k$ in the transcript D, can be defined by the following formula:

$$\text{score}(k, t_0^k, D) = 1 - \frac{\sum_{i=1}^{l} 5(t_i^k - (t_{i-1}^k + d_{i-1}^k))}{l}$$

The above formula is just an example of a ranking formula that takes into account the time information extracted from the index, and that can also justifies the need to index timestamp information. This ranking method can be combined with classical ranking methods such as tfidf (term frequency, inverse document frequency), edit distance etc.

An indexing system or a search system as described may be provided as a service to a customer over a network.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

I claim:

1. A computer-implemented method of searching speech data comprising in-vocabulary and out-of-vocabulary words, the method comprising, via a computer processor executing stored program instructions:

Receiving, by the computer processor, a search query comprising a phrase comprising at least one in-vocabulary word and at least one out-of-vocabulary word;

extracting, by the computer processor, search terms from the phrase, the search terms comprising at least one in-vocabulary search term and at least one out-of-vocabulary search term;

retrieving, by the computer processor, a first list of occurrences of words for the at least one in-vocabulary search term, the first list retrieved from a first index of words having first timestamps;

retrieving, by the computer processor, a second list of occurrences of sub-words for the at least one out-of-vocabulary search term, the second list retrieved from a second index of sub-words having second timestamps; and merging, by the computer processor, the first list of occurrences of words and the second list of occurrences of sub-words to create a merged list, wherein merging the first list and the second list comprises evaluating the first timestamps and the second timestamps and adding to the merged list occurrences of combinations of words from the first list and sub-words from the second list that satisfy at least one evaluation criterion, wherein the at least one evaluation criterion comprises a threshold for a difference between first and second timestamps.

2. The method of searching as claimed in claim 1, wherein sub-word transcripts are generated by a speech recognition system with a vocabulary of sub-words, wherein sub-words comprise phones, morphemes, syllables, or sequences of phones from the vocabulary of sub-words.

3. The method of searching as claimed in claim 1, wherein word transcripts are generated by a speech recognition system with a vocabulary of words, and in-vocabulary words are words in the vocabulary of words.

4. The method of searching of claim 1, further comprising checking that an occurrence of a word in the first list and an occurrence of a sub-word in the second list are an order consistent with the phrase of the received search query, according to a first timestamp of the word and a second timestamp of the sub-word.

5. The method of searching of claim 1, wherein:
   a first timestamp comprises a start time for a word and a duration of the word;
   a second timestamp comprises a start time for a sub-word and a duration of the sub-word; and
   the method of searching further comprises checking that a word and a sub-word are adjacent by checking that either a difference between an end time of the word and a start time of the sub-word or a difference between an end time of the sub-word and a start time of the word is below a given threshold, wherein an end time comprises a start time plus a duration.

6. The method of searching of claim 1, wherein merging the first list and the second list generates search results that match the phrase of the search query and wherein the method further comprises ranking the search results according to temporal proximity of adjacent pairs of words and sub-words in the search results.

7. The method of claim 1, further comprising comparing the first timestamps and the second timestamps to check that words and sub-words appear in the right order according to their begin times.

8. The method of claim 1, further comprising comparing the first timestamps and the second timestamps to check that a difference in time between adjacent words and sub-words is under the threshold.

9. A system comprising:
   at least one processor programmed to:
     receive a search query comprising a phrase comprising at least one in-vocabulary word and at least one out-of-vocabulary word;
     extract search terms from the phrase, the search terms comprising at least one in-vocabulary search term and at least one out-of-vocabulary search term;
     retrieve a first list of occurrences of words for the at least one in-vocabulary search term, the first list retrieved from a first index of words having first timestamps;
     retrieve a second list of occurrences of sub-words for the at least one out-of-vocabulary search term, the second list retrieved from a second index of sub-words having second timestamps; and
     merge the first list of occurrences of words and the second list of occurrences of sub-words to create a merged list, wherein merging the first list and the second list comprises evaluating the first timestamps and the second timestamps and adding to the merged list occurrences of combinations of words from the first list and sub-words from the second list that satisfy at least one evaluation criterion, wherein the at least one evaluation criterion comprises a threshold for a difference between first and second timestamps.

10. The system of claim 9, wherein sub-word transcripts are generated by a speech recognition system with a vocabulary of sub-words, wherein sub-words comprise phones, morphemes, syllables, or sequences of phones from the vocabulary of sub-words.

11. The system of claim 9, wherein word transcripts are generated by a speech recognition system with a vocabulary of words, and in-vocabulary words are words in the vocabulary of words.

12. The system of claim 9, wherein the at least one processor is further programmed to check that an occurrence of a word in the first list and an occurrence of a sub-word in the second list are in an order consistent with the phrase of the received search query, according to a first timestamp of the word and a second timestamp of the sub-word.

13. The system of claim 9, wherein:
   a first timestamp comprises a start time for a word and a duration of the word;
   a second timestamp comprises a start time for a sub-word and a duration of the sub-word; and
   the at least one processor is further programmed to check that a word and a sub-word are adjacent by checking that either a difference between an end time of the word and a start time of the sub-word or a difference between an end time of the sub-word and a start time of the word is below a given threshold, wherein an end time comprises a start time plus a duration.

14. The system of claim 9, wherein the at least one processor is further programmed to generate search results that match the phrase of the search query and to rank the search results according to temporal proximity of adjacent pairs of words and sub-words in the search results.

15. The system of claim 9, wherein the at least one processor is further programmed to compare the first timestamps and the second timestamps to check that words and sub-words appear in the right order according to their begin times.

16. The system of claim 9, wherein the at least one processor is further programmed to compare the first timestamps and the second timestamps to check that a difference in time between adjacent words and sub-words is under the threshold.

17. At least one non-transitory computer-readable storage medium comprising
   instructions that, when executed by at least one processor, execute a method comprising:
     receiving a search query comprising a phrase comprising at least one in-vocabulary word and at least one out-of-vocabulary word;
     extracting search terms from the phrase, the search terms comprising at least one in-vocabulary search term and at least one out-of-vocabulary search term;
     retrieving a first list of occurrences of words for the at least one in-vocabulary search term, the first list retrieved from a first index of words having first timestamps;
     retrieving a second list of occurrences of sub-words for the at least one out-of-vocabulary search term, the second list retrieved from a second index of sub-words having second timestamps; and
     merging the first list of occurrences of words and the second list of occurrences of sub-words to create a merged list, wherein merging the first list and the second list comprises evaluating the first timestamps and the second timestamps and adding to the merged list occurrences of combinations of words from the first list and sub-words from the second list that satisfy at least one evaluation criterion, wherein the at least one evaluation criterion comprises a threshold for a difference between first and second timestamps.

18. The at least one non-transitory computer-readable storage medium of claim 17, wherein sub-word transcripts are generated by a speech recognition system with a vocabulary of sub-words, wherein sub-words comprise phones, morphemes, syllables, or sequences of phones from the vocabulary of sub-words.

19. The at least one non-transitory computer-readable storage medium of claim 17, wherein word transcripts are generated by a speech recognition system with a vocabulary of words, and in-vocabulary words are words in the vocabulary of words.

20. The at least one non-transitory computer-readable storage medium of claim 7, wherein the method further comprises checking that an occurrence of a word in the first list and an occurrence of a sub-word in the second list are in an order consistent with the phrase of the received search query, according to a first timestamp of the word and a second timestamp of the sub-word.

21. The at least one non-transitory computer-readable storage medium of claim 17, wherein:
   a first timestamp comprises a start time for a word and a duration of the word;
   a second timestamp comprises a start time for a sub-word and a duration of the sub-word;
   and the method further comprises checking that a word and a sub-word are adjacent by checking that either a difference between an end time of the word and a start time of the sub-word or a difference between an end time of the sub-word and a start time of the word is below a given threshold, wherein an end time comprises a start time plus a duration.

22. The at least one non-transitory computer-readable storage medium of claim 17, wherein merging the first list and the second list generates search results that match the phrase of the search query and wherein the method further comprises ranking the search results according to temporal proximity of adjacent pairs of words and sub-words in the search results.

23. The at least one non-transitory computer-readable storage medium of claim 17, wherein the method further comprises comparing the first timestamps and the second timestamps to check that words and sub-words appear in the right order according to their begin times.

24. The at least one non-transitory computer-readable storage medium of claim 17, wherein the method further comprises comparing the first timestamps and the second timestamps to check that a difference in time between adjacent words and sub-words is under the threshold.

* * * * *